Figure 1:
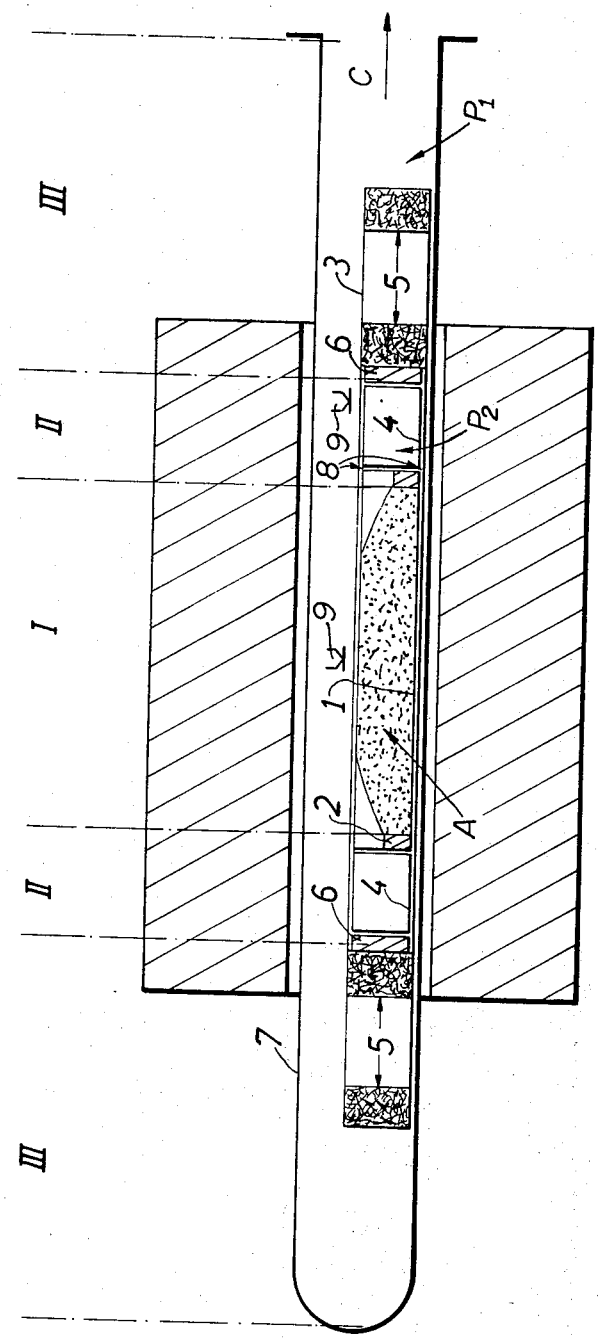

Jan. 9, 1968  R. WEISBECK  3,362,795
PRODUCTION OF HIGHLY PURE HEXAGONAL CRYSTALS OF CADMIUM AND
ZINC CHALKOGENIDES BY SUBLIMATION
Filed Oct. 4, 1963
2 Sheets-Sheet 1

INVENTOR.
ROLAND WEISBECK
BY
ATTORNEYS

United States Patent Office  
3,362,795  
Patented Jan. 9, 1968

3,362,795  
PRODUCTION OF HIGHLY PURE HEXAGONAL CRYSTALS OF CADMIUM AND ZINC CHALKOGENIDES BY SUBLIMATION  
Roland Weisbeck, Cologne-Poll, Germany, assignor to Farbenfabriken Bayer Aktiengesellschaft, Leverkusen, Germany, a German corporation  
Filed Oct. 4, 1963, Ser. No. 313,972  
Claims priority, application Germany, Oct. 13, 1962, F 38,031  
2 Claims. (Cl. 23—294)

The invention relates to a process for the production of highly pure hexagonal zinc- and cadmium chalkogenides from highly impure and therefore inexpensive industrial starting materials.

Pure hexagonal sulphides, selenides and sulphoselenides of cadmium and zinc sulphide are required, for example, for photo-semiconductor purposes for the production of photo-resistances, photoelements, electro-luminescent arrangements, X-ray image amplifiers and light amplifiers.

It is known to produce these pure chalkogenides by synthesis from the elements in the vapour phase or by precipitation with hydrogen sulphide or selenide from a zinc or cadmium salt solution, e.g. from a cadmium acetate or cadmium sulphate solution. Apart from the necessity of having to use very pure and thus expensive starting products with both of these methods, the synthesis from the elements has the disadvantage that the chalkogenides are obtained with more or less large deviations from the stoichiometric ratio, whereas with the precipitation methods, several processing steps are necessary, any of which may involve the danger of entrainment of impurities. Furthermore, with the latter method, the aforesaid chalkogenides always contain an excess of sulphur or selenium and exists in the amorphous or cubic form, which must be transformed by a thermal after treatment into the hexagonal form if the cadmium sulphide is to be used for photo-semiconductor purposes.

It is also known to grow e.g. pure cadmium sulphide monocrystals from the vapor phase. For this purpose, either a dynamic method or a static method is used. In the dynamic method, pure cadmium is vaporized and is conducted in a stream of hydrogen sulphide or a gas mixture consisting of hydrogen sulphide, hydrogen and nitrogen or argon through a zone at about 800 to 900° C. with subsequent temperature drop. In the static method, pure cadmium sulphide is vaporized within a zone at 900 to 1300° C. and is crystallized out at areas with a temperature which is about 100° C. lower, the operation in this case being carried out in an atmosphere consisting of hydrogen sulphide, hydrogen, nitrogen, argon or mixtures of these gases at pressures from 200 to 900 mm. Hg. With both of these methods, it is necessary to use pure starting materials and gases if pure crystals are required. Nevertheless, the purity of the crystals which are obtained is no better than the purity of the starting materials. With both methods, the times necessary for the growth of crystals from the vapor phase is of the order of several days.

The present invention is concerned with a process for the production of highly pure hexagonal metal chalkogenides selected from the group consisting of cadmium sulphide, cadmium selenide, cadmium sulphoselenide and zinc sulphide wherein the aforesaid highly pure hexagonal metal chalkogenides with a stoichiometric composition are crystallized from the technical grade metal chalkogenides by fractional sublimation in vacuum in a zone, in which zone is maintained a temperature gradient of 5–15° C./cm. referred to the evaporation temperature of about 750–1200° C. under an artificially elevated partial pressure gradient referred to the vacuum applied.

The following description describes as an example the production of pure cadmium sulphide. In an analogous manner however cadmium selenide, cadmium sulphoselenide, zinc sulphide can be prepared in a highly pure hexagonal form.

In one preferred embodiment, the vaporization of the technical grade cadmium sulphide, the crystallization of the highly pure cadmium sulphide and the deposition of the readily volatile impurities is carried out in three zones:

(a) In zone I technical cadmium sulphide is heated slowly to a temperature between 750° C. and 1000° C.—preferably 850–950° C.—in a vacuum below 0.1 mm. Hg;

(b) In zone II highly pure cadmium sulphide is crystallized in a temperature drop of 5–15° C./cm. preferably 10° C./cm. referred to the evaporation temperature of zone I, whereby the cadmium sulphide partial pressures in zones I and II are artificially elevated, however by maintaining a partial pressure gradient between said zones and (c) In zone III a total pressure of less than 0.1 mm. of Hg absolute is applied and part of the readily volatile impurities are separated out at cold areas.

A suitable apparatus for carrying out the present process as described above comprises a vessel which can be evacuated and which is of temperature-resistant, chemically neutral material with a smooth surface for the collecting of the cadmium sulphide, crystallizing from the vapor phase, and for the deposition of the readily volatile impurities, as well as an adjustable heating arrangement and a vacuum pump. In this arrangement a temperature drop exists between zone I and zone III. The temperature drop is about 5–15° C., preferably 10° C./cm. within the zone II, and the zones I and II are connected through a throttling arrangement to the zone III and the vacuum pump.

Figure 2:
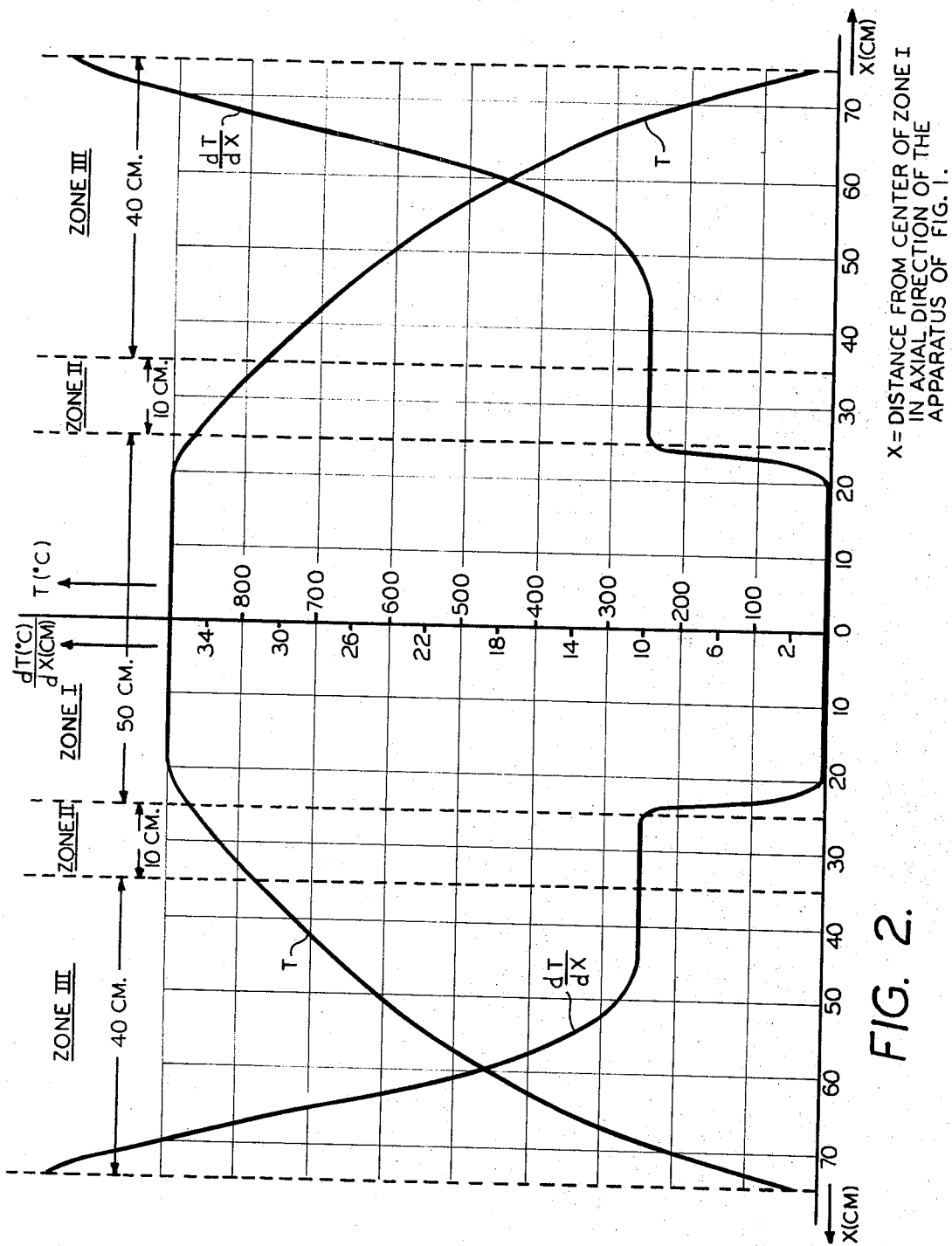

Understanding of this invention will be facilitated by reference to the accompanying drawing, in which:

FIG. 1 is a cross-sectional view of an apparatus according to this invention; and FIG. 2 is a plot of a series of curves illustrating the practice of this invention.

The starting material A lies in a tube 1 which is adjusted horizontally or at a slight angle and which is made of a temperature-resistant material which does not contaminate CdS at high temperatures, e.g. quartz or pure aluminum oxide. The tube 1 is partially closed at both ends by pieces 2 of the same or similar material loosely positioned therein and is completely enclosed with a slight clearance in a longer tube 3 of like or similar material, e.g. a tube which is twice as long. Two short tubes 4 of suitable length and of the same or similar material with a smooth internal surface are adjusted in the tube 3 so as to fit tightly at both ends of the tube 1.

The tubes 4 are sealed off at their outer ends in the arrangement according to the drawing by a tightly fitted plate 6 of the same or similar material which is smooth on the inside. Arranged behind each of these plates 6 and likewise at the ends of the tube 3, is a throttle arrangement which can consist for example of a plug consisting of quartz wool 5 with a good fit on the tube 3.

The tube 3 with its contents is arranged in a thermally resistant tube 7 which is sealed in vacuum-tight manner at one end and in which the smallest possible gasification takes place, e.g. a tube consisting of a vacuum-tight ceramic mass, which is evacuated through the open end and is brought into a suitable temperature field, a like maximum temperature existing over practically the entire length of the tube 1, the temperature decreasing towards both ends in such a way that a temperature gradient of about 10° C./cm. is maintained in the tubes 4. The temperature field is preferably produced by an electrically heated tube furnace with a suitably constructed heating coil 10. The maximum temperature can for example be suitably controlled electrically by a thermocouple 9 which is arranged in the tube 7 at a position of maximum temperature and is brought and kept at the rated value by means of an automatic controller. The rated value lies between approximately 750 and 1000° C., advantageously between 850 and 950° C., and prevails for about 1 to 10 hours in the region of the starting material, according to maximum temperature. A temperature zone showing the temperature level in zone I and the temperature drop in zones II and III has been set out in FIG. 1.

The tube 7 is flanged at its open end, which is outside the heated zones, to a suitable distribution box, which in turn is flanged at right angles with respect to the tube axis to a vacuum pump assembly. All flange gaskets contain rubber O-ring seals. The pump assembly consists for example, of a two-stage rotary slide valve oil pump or of such a rotary slide valve pump with a multi-stage oil diffusion pump connected in series, depending on whether it is desired to work in the vacuum range down to about $10^{-2}$ to $10^{-3}$ mm. Hg. or down to about $10^{-5}$ mm. Hg. The charging of the tube 7 is effected through a readily removable inspection glass which is flanged onto the distributor element and permits vision in the direction of the tube axis.

Any desired industrial cadmium sulphide, even one which is highly impure can be used as starting material for the process according to the invention. On starting the process, the tube furnace is slowly heated up over a period of 1 to 8 hours from room temperature up to maximum temperature, the period depending on the quantity and the impurities of the CdS used. Simultaneously, the tube is exhausted; this is effected either only with a constantly running rotary pump (fine vacuum) or, in addition, with a continuously running diffusion pump (high vacuum). Throughout the entire process, a vacuum better than 0.1 mm. Hg is maintained in the zone I, while the partial pressures of the CdS and of the impurities rise up to the saturation vapor pressures which correspond to the prevailing temperature. In the zone III, the total pressure—P1 is always less than 0.1 mm. of Hg absolute and generally it is even substantially better.

During the heating-up process, readily volatile impurities C in the starting material are conveyed from the zone I into the zone III because of the temperature gradient and of the partial pressure gradient maintained by the pump or pumps or are exhausted by the pump or pumps. Most of the impurities are deposited on well defined areas of the tube 3 between the two successive throttle arrangements. Sharply defined colored rings are subsequently detected on the inside wall of the tube 3, which originate from different impurities. Another but smaller part of the impurities is deposited in the tube 7 or in a water-cooled trap before the entry into the pump installation. The uncondensed impurities are exhausted by the pump installation and conveyed into the atmosphere.

Above a temperature of about 600° C. an appreciable evaporation of the cadmium sulphide commences, this being partially a true sublimation and partially a thermal dissociation of the cadmium sulphide into cadmium and sulphur. These vapors migrate from the zone I into zone II in which the lower temperature is maintained. The conditions are so chosen that, because of the special temperature drop and partial pressure in zone II, there is effected a preferred crystallization of the CdS B from the vapor phase in said zone II. The effect produced by fitting the two internal throttle arrangements with high flow resistance is that a sufficiently high probability exists of cadmium and sulphur again reacting to CdS at the lower temperatures. Hexagonal and highly pure CdS preferentially crystallizes into polycrystalline layers, but also in the form of monocrystals, on the inside walls of the tubes 4 and the plates 6. Cadmium and sulphur vapors which are not able to react in the zone II to form CdS migrate as impurities into the zone III, where they then condense. The result thereby achieved is that the CdS crystallized out in zone II is present in stoichiometric form.

The difficultly volatile impurities remain in zone I, and are concentrated in the residue. The yield of crystalline CdS in the zone II can amount to more than 90%, calculated on the quantity of the starting material. However, it is not advisable to force the yield to such a high level that the yield is increased at the cost of the purity of the product. This is due to the fact that the difficultly volatile impurities have a lower but still finite vapor pressure at the temperatures which are used. On account of the increase in concentration of the impurities in the residue, a certain probability exists that, with the production of very high yields, the purity of the crystalline CdS in zone II will be impaired by the difficultly volatile impurities. The purity of the CdS is at its optimum value with yields up to about 65%.

The purity also depends on the temperatures in the zones I and II. The higher the temperature in the zone I, the more quickly does the transport of CdS take place, but the purity of the CdS crystallizing in the zone II is reduced. At temperatures between 850 and 950° C., the transport of CdS into the zone II is considerable, and the purity up to about 950° C. is not impaired in practice either by (1) Evaporation of difficultly volatile impurities from the starting material, or
(2) By chemical reactions of the wall material with the starting material it being possible for constituents of the wall material to vaporize.

By way of example, there is mentioned the chemical action by alkali impurities of the starting material on quartz as wall material, it being possible for Si to vaporize.

The transport and thus the yield of CdS also depend on the strength of the partial pressure drop. For example, if the total pressure in the zone III is lowered by a few powers of ten, by using a high-vacuum pump, e.g. an oil diffusion pump, then the yield, under otherwise the same conditions, is increased by about 10 to 20% by comparison with the case where only a fine vacuum pump, e.g. a rotary pump, is employed. The purity due to the use of high vacuum is better only to an immaterial degree, related to the same yield.

Polycrystalline coatings and monocrystals in the form of hexagonal needles and columns or in the form of whiskers or transparent yellow flakes grow on the smooth walls inside the zone II. The polycrystalline layers adhere fairly firmly to the walls and the danger exists of the vessel being broken with the detachment thereof or of the CdS being contaminated. In order to reduce the adhesion strength of the CdS to the walls, it is possible for the latter to be vapor-coated beforehand with an almost completely transparent carbon layer. This layer does not introduce any impurities into the CdS. The production of such a transparent carbon layer can for example be effected by keeping the corresponding parts for a short time above a flame of a low-boiling point hydrocarbon, e.g. above the flame of burning pure acetone. An additional advantage in the removal of the CdS coatings is obtained by placing rods of smooth, thermally resistant material, which do not contaminate the CdS, in the tubes 4 and thereafter easily extracting these rods, whereby the CdS coatings then being immediately detached.

The process according to the invention for the production of pure crystalline CdS can also be used for the production of CdS vacuum vapor deposited layers of considerable thickness, e.g. a thickness up to about 1 to 2 cm. For this purpose, the arrangement shown diagrammatically in the drawing 1 can be slightly modified, by replacing the tubes 4 by quite short tube sections, so that the crystalline CdS layers grow predominantly on the plates 6. These thick CdS layers can be mechanically aftertreated, e.g. polished and detached as a whole from the carrier plates 6.

The advantages of the process according to the invention for the production of highly pure chalkogenides of cadmium and zinc—cadmium sulphide, -selenide, -sulphoselenide and zinc sulphide—as compared with the prior known processes, starting products, but it is possible starting from a cheap and even highly impure industrial materials, to obtain crystalline, hexagonal cadmium and zinc chalkogenides of particularly high purity in a few hours and in a single processing step. The total concentration of impurities in the pure products are below 0.0005% and are largely independent of the degree of contamination of the starting materials. Since the products obtained are already crystalline, it is not necessary to use a temperature treatment such as is required with all products which have been produced by precipitation when they are used for photo-semiconductor purposes. By employing the vacuum process, there is obtained a substantially degasified compact CdS, the density of which (based on water of 4° C.) is 4.83 g./cc. The CdS is of stoichiometric composition, which could hardly be achieved with the prior known methods of production using high temperature.

EXAMPLE 1

As starting material, there is employed a cheap, industrial cadmium sulphide, of which the content of impurities was determined by ultra-violet spectroscopic analysis (see Table 1).

Table 1.—Ultra-violet spectroscopic analysis of industrial cadmium sulphide

| Element: | Percent content |
|---|---|
| Ba, Zn | 1–5 |
| Na, Si | 0.5–1 |
| Ca | 0.1–0.5 |
| Cu, Fe | 0.05–0.1 |
| Al | 0.01–0.05 |
| Ti | 0.005–0.01 |
| Mg, B, Cr | 0.001–0.005 |
| Sr | 0.0005–0.001 |
| Zr | <0.0005 |

The crude product (500 g.) is heated in an apparatus an advantageous arrangement of which is shown in the figure, with a heating-up period of about 2½ hours, the product being heated from room temperature to 900° C. The temperature is maintained for 3 hours. Throughout the entire experiment, evacuation was effected with a two-stage rotary oil pump. The yield is 310 g. of crystallized highly pure cadmium sulphite, i.e., 62%, with the following analysis results: by ultra-violet spectroscopy, only Si was found as impurity in a quantity smaller than 0.0005%. No impurities could be detected by X-ray spectroscopy. The following are determined by colorimetry: about 0.00002% of Cu, less than 0.00003% of Fe and less than 0.00002% of Cr. Using a solid body mass spectrometer with a spark ion source, there are found 0.0001% of Ba and Si, 0.00005% of Ca, P and Cl.

EXAMPLE 2

As starting material a cheap, industrial cadmium selenide, was used, containing impurities according to ultra-violet spectroscopic analysis in an amount of: (see Table 2).

Table 2.—Ultra-violet spectroscopic analysis of industrial cadmium selenide

| Element: | Percent content |
|---|---|
| Ba, Zn | 1–5 |
| Si | 0.5–1 |
| Na, Ca | 0.1–0.5 |
| Al, Cu, Fe, Mg | 0.05–0.1 |
| In | 0.01–0.05 |
| Sr | 0.005–0.01 |
| B | 0.001–0.005 |
| Cr, Mn | 0.0005–0.001 |
| Be | 0.0005 |

The crude product (500 g.) is heated in an apparatus which is shown in the figure with a heating-up period of 2½ hours, the product being heated from room temperature to 900° C. The temperature is maintained for 2½ hours. Throughout the entire experiment, evacuation was effected with a two-stage rotary oil pump. The yield is 330 g. of crystallized highly pure cadmium selenide, i.e. 66%. By ultra-violet spectroscopy only Si and Ba were found as impurity in a quantity smaller than 0.0005%.

EXAMPLE 3

As starting material there is used a cheap, industrial zincsulphide, containing the following impurities as determined by ultra-violet spectroscopic analysis (see Table 3).

Table 3.—Ultra-violet spectroscopic analysis of industrial zincsulphide

| Element: | percent content |
|---|---|
| Si, Ca | 0.5–1 |
| Ba, Cd, Cu, Pb | 0.1–0.5 |
| Na, Sr | 0.05–0.1 |
| Al, Fe | 0.01–0.05 |
| Ti, Cr | 0.005–0.01 |
| Mg, B | 0.001–0.005 |
| Mn | 0.0005–0.001 |

The crude product (500 g.) is heated in an apparatus which is to be seen in the FIGURE 1, with a heating-up period of about 3¼ hours, the product being heated from room temperature to 1000° C. The temperature is maintained for 4 hours. Throughout the entire experiment, evacuation was effected with a two-stage rotary oil pump. The yield is 280 g. of crystallized highly pure zincsulphide, i.e. 56%. By ultra-violet spectroscopy only Si and Ca were found as impurity in a quantity smaller than 0.0005%.

I claim:
1. A process for the production of highly pure hexagonal crystals of metal chalkogenides selected from the group consisting of cadmium sulfide, cadmium selenide, cadmium sulfoselenide and zinc sulfide by sublimation which comprises subliming impure metal chalkogenide containing volatile and non-volatile impurities by heating in a first zone to a temperature of between 750–1200° C. while continuously maintaining an absolute pressure in said first zone of less than 0.1 mm. of Hg to form a vapor mixture of metal chalkogenide and volatile impurities, passing said vapor mixture into a contiguous second zone, maintaining a decreasing temperature gradient of about 10° C. per centimeter in said second zone and a third contiguous zone progressing away from the first zone maintaining a temperature drop in said second zone relative to the temperature in said first zone of between 5 and 15° C., thereby crystallizing highly pure hexagonal metal chalkogenide crystals from said vapor mixture in said second zone at a crystallizing temperature which is lower than that at which said mixture is evaporated, continuously withdrawing the volatile impurities from the second zone into the third contiguous zone by maintaining said third zone at a pressure substantially less than the pressure in said second zone, maintaining a temperature in the third zone sufficiently lower than the tem- perature in the second zone to precipitate said volatile impurities in the third zone, continuously withdrawing any non-condensed gases from the third zone into a fourth contiguous zone by maintaining said fourth zone at a pressure substantially less than the pressure in said third zone, the vapor flow through the second and third zones being induced by a vacuum imposed on said fourth zone, and the pressure drops between the second and third, and third and fourth zones being maintained by throttling the vapors flowing between the zones so as to impose a substantial reduction in pressure between the zones.

2. A process according to claim 1, wherein the temperature in said first zone is between 850–950° C.

References Cited

UNITED STATES PATENTS

| | | | |
|---|---|---|---|
| 2,860,948 | 11/1958 | Fried | 23—294 XR |
| 2,944,878 | 7/1960 | Jacque | 23—294 |
| 2,947,613 | 8/1960 | Reynolds | 23—294 |
| 3,042,501 | 7/1962 | Noblitt | 23—294 |
| 3,218,203 | 12/1965 | Ruehruein | 23—294 XR |

FOREIGN PATENTS

| | | | |
|---|---|---|---|
| 239,908 | 8/1960 | Australia | 23—294 |
| 1,163,905 | 5/1958 | France | 23—294 |
| 825,356 | 12/1959 | Great Britain | 23—294 |

OTHER REFERENCES

Boyd et al.: Journal of Applied Physics, vol. 30, #2 February 1959, pp. 176 to 179.

Ibuki: Journal of Physical Society of Japan, vol. 14, #9, September 1959, pp. 1181 to 1195.

Lawson et al.: Preparation of Single Crystals, Butterworth Sci. Publ., 1958, pp. 89 to 91 and 134 to 144.

NORMAN YUDKOFF, *Primary Examiner.*

S. J. EMERY, *Assistant Examiner.*